(12) United States Patent
Crane

(10) Patent No.: US 7,914,233 B2
(45) Date of Patent: Mar. 29, 2011

(54) METHOD AND APPARATUS FOR INSTALLING AN UNDERGROUND PIPE

(75) Inventor: Robert E. Crane, Oconomowoc, WI (US)

(73) Assignee: Harr Technologies LLC, Kasilof, AK (US)

( * ) Notice: Subject to any disclaimer, the term of this patent is extended or adjusted under 35 U.S.C. 154(b) by 235 days.

(21) Appl. No.: 11/372,541

(22) Filed: Mar. 10, 2006

(65) Prior Publication Data
US 2007/0212169 A1 Sep. 13, 2007

(51) Int. Cl.
E21B 7/26 (2006.01)
F16L 55/26 (2006.01)
F16L 1/028 (2006.01)

(52) U.S. Cl. .......... 405/184.3; 173/91; 175/19; 405/184
(58) Field of Classification Search ....... 405/184–184.3; 173/91; 175/19, 296
See application file for complete search history.

(56) References Cited

U.S. PATENT DOCUMENTS

| | | | | |
|---|---|---|---|---|
| 4,637,756 A | * | 1/1987 | Boles | 405/184 |
| 4,749,050 A | * | 6/1988 | Ritter | 175/19 |
| 5,025,868 A | * | 6/1991 | Wentworth et al. | 173/91 |
| 5,112,158 A | * | 5/1992 | McConnell | 405/184.3 |
| 5,337,837 A | * | 8/1994 | Wentworth et al. | 175/19 |
| 5,505,270 A | | 4/1996 | Wentworth | 173/1 |
| 5,603,383 A | | 2/1997 | Wentworth et al. | 173/91 |
| 5,980,157 A | | 11/1999 | Puttman | 405/184 |
| 6,109,832 A | * | 8/2000 | Lincoln | 405/184 |
| 6,269,889 B1 | * | 8/2001 | Wentworth | 173/91 |
| 6,299,382 B1 | * | 10/2001 | Wentworth | 405/184 |
| 7,055,621 B2 | * | 6/2006 | Wentworth et al. | 173/200 |
| 7,131,790 B1 | * | 11/2006 | Cordoves | 405/184 |
| 2001/0016148 A1 | * | 8/2001 | Wentworth et al. | 405/184 |
| 2003/0017008 A1 | * | 1/2003 | Robinson | 405/184.3 |
| 2003/0152428 A1 | * | 8/2003 | Wentworth et al. | 405/184.2 |
| 2005/0111919 A1 | * | 5/2005 | Wentworth et al. | 405/184.3 |
| 2005/0214070 A1 | | 9/2005 | Harr | 404/2 |

FOREIGN PATENT DOCUMENTS

GB 2213904 A * 8/1989

* cited by examiner

*Primary Examiner* — Tara Mayo-Pinnock
(74) *Attorney, Agent, or Firm* — Dorsey & Whitney LLP

(57) ABSTRACT

A method for installing an underground pipe using a ground piercing tool comprises the steps of: fitting an expander onto a front nose of the tool, securing the pipe to the expander so that the ground piercing tool is disposed inside of the pipe, operating the tool in forward mode over a run to pull the pipe into the ground, removing the ground piercing tool from the expander and pipe by moving it in a rearward direction through the newly installed pipe, and leaving the expander in the ground, preferably to form the front end of the newly installed pipe. It is not required that each of the foregoing steps be conducted in the order recited. For example, the expander could be secured to the pipe after which the expander and pipe could be fitted over the tool.

5 Claims, 2 Drawing Sheets

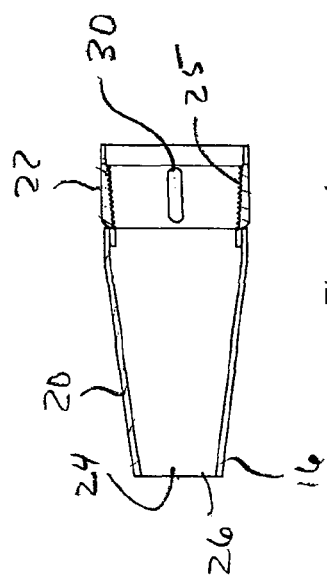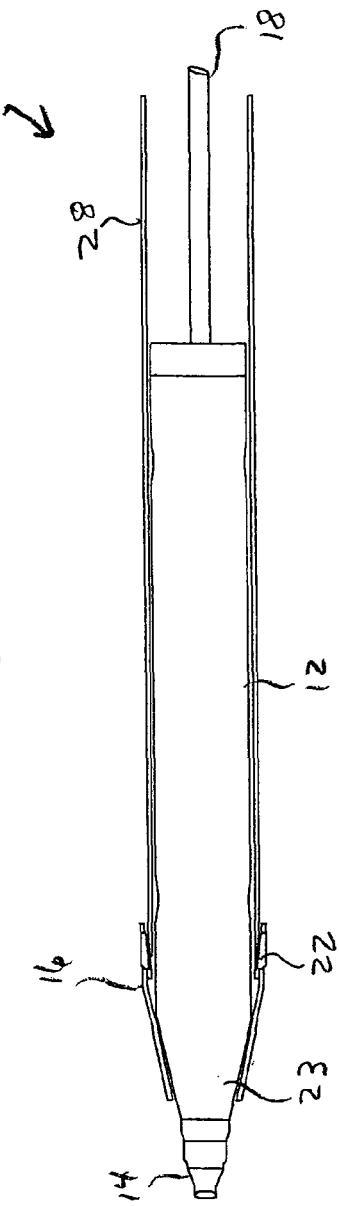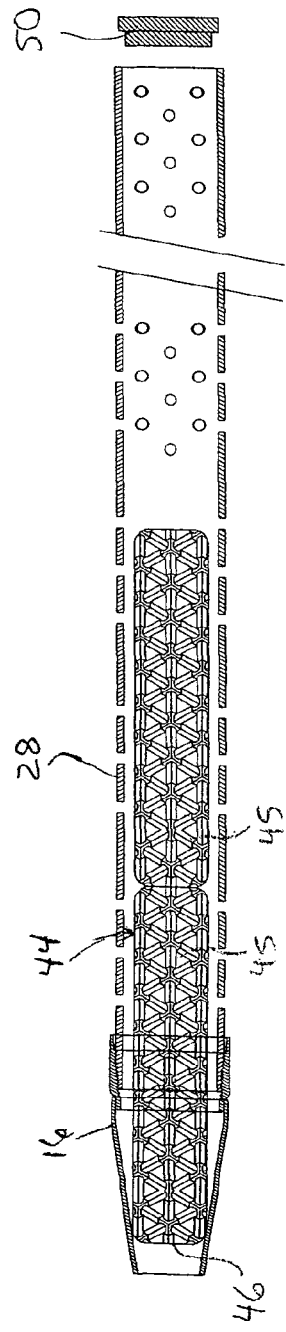

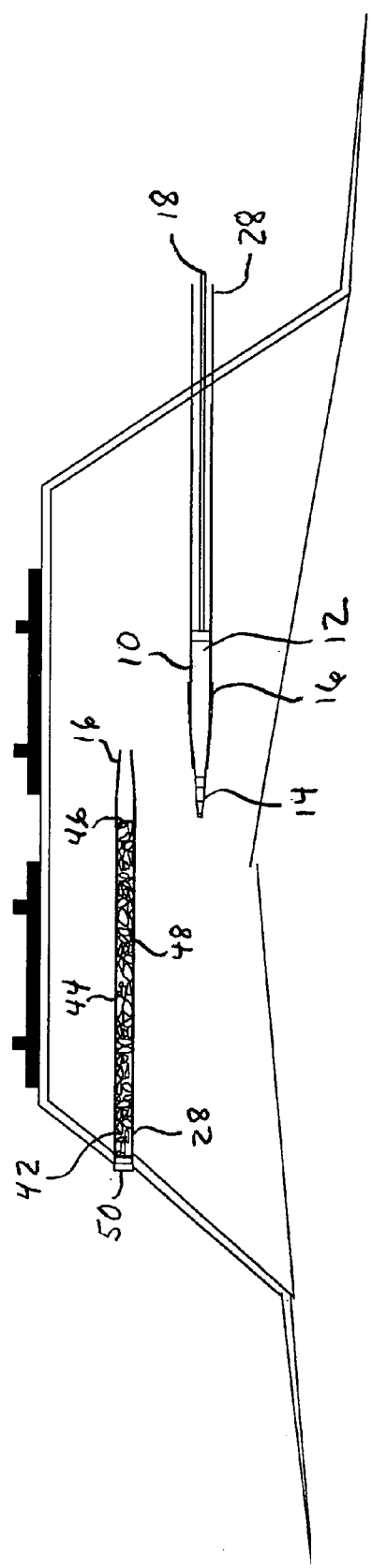

METHOD AND APPARATUS FOR INSTALLING AN UNDERGROUND PIPE

TECHNICAL FIELD

The invention relates to methods of installing underground pipes using pneumatic impact tools, particularly self-propelled ground piercing tools.

BACKGROUND OF THE INVENTION

Self-propelled pneumatic tools for making small diameter holes through soil are well known. Such tools are used to form holes for pipes or cables beneath roadways without need for digging a trench across the roadway. These tools include, as general components, a torpedo-shaped body having a tapered nose and an open rear end, an air supply hose which enters the rear of the tool and connects it to an air compressor, a piston or striker disposed for reciprocal movement within the tool, and an air distributing mechanism for causing the striker to move rapidly back and forth. The striker impacts against the front wall (anvil) of the interior of the tool body, causing the tool to move violently forward into the soil. The friction between the outside of the tool body and the surrounding soil tends to hold the tool in place as the striker moves back for another blow, resulting in incremental forward movement through the soil. Exhaust passages are provided in the tail assembly of the tool to allow spent compressed air to escape into the atmosphere.

Most impact boring tools of this type have a valveless air distributing mechanism which utilizes a stepped air inlet. The step of the air inlet is in sliding, sealing contact with a tubular cavity in the rear of the striker. The striker has radial passages through the tubular wall surrounding this cavity, and an outer bearing surface of enlarged diameter at the rear end of the striker. This bearing surface engages the inner surface of the tool body.

Air fed into the tool enters the cavity in the striker through the air inlet, creating a constant pressure which urges the striker forward. When the striker has moved forward sufficiently far so that the radial passages clear the front end of the step, compressed air enters the space between the striker and the body ahead of the bearing surface at the rear of the striker. Since the cross-sectional area of the front of the striker is greater than the cross-sectional area of its rear cavity, the net force exerted by the compressed air now urges the striker backwards instead of forwards. This generally happens just after the striker has imparted a blow to the anvil at the front of the tool.

As the striker moves rearwardly, the radial holes pass back over the step and isolate the front chamber of the tool from the compressed air supply. The momentum of the striker carries it rearward until the radial holes clear the rear end of the step. At this time the pressure in the front chamber is relieved because the air therein rushes out through the radial holes and passes through exhaust passages at the rear of the tool into the atmosphere. The pressure in the rear cavity of the striker, which defines a constant pressure chamber together with the stepped air inlet, then causes the striker to move forwardly again, and the cycle is repeated.

In some prior tools, the air inlet includes a separate air inlet pipe, which is secured to the body by a radial flange having exhaust holes therethrough, and a stepped bushing connected to the air inlet pipe by a flexible hose. These tools have been made reversible by providing a threaded connection between the air inlet sleeve and the surrounding structure which holds the air inlet concentric with the tool body. The threaded connection allows the operator to rotate the air supply hose and thereby displace the stepped air inlet rearwardly relative to the striker. Since the stroke of the striker is determined by the position of the step, i.e., the positions at which the radial holes are uncovered, rearward displacement of the stepped air inlet causes the striker to hit against the tail nut at the rear of the tool instead of the front anvil, driving the tool rearward out of the hole. See, for example, Wentworth et al. U.S. Pat. Nos. 5,025,868 and 5,337,837.

Expanders are tapered, ring-shaped shells that fit over the tapered nose portion of an earth boring tool in order to widen the hole made by the tool as it passes through the ground. In this manner, a 4 inch diameter tool may be used to make a 6 or 8-inch diameter hole. The tool is often sent through to make an initial bore, and then sent through a second time with the expander in order to widen the existing hole and/or crack an existing pipe.

Commonly-assigned U.S. Pat. No. 6,299,382, the contents of which is incorporated herein by reference, discloses a method for installing an underground pipe using a ground piercing tool by fitting an expander onto the nose of the tool body, securing the pipe to the expander so that the ground piercing tool is disposed inside of the pipe, and operating the tool in forward mode over a run to pull the pipe into the ground. When the tool has reached a manhole at the end of the run, the nose of the tool is removed from the expander and the expander is disconnected from the pipe. The ground piercing tool is removed from the pipe by moving it in a rearward direction through the newly installed pipe. The present invention provides a method of installing pipelines especially for use as drains in a variety of environments.

SUMMARY OF THE INVENTION

A method for installing an underground pipe using a ground piercing tool comprises the steps of: fitting an expander onto a front nose of the tool, securing the pipe to the expander so that the ground piercing tool is disposed inside of the pipe, operating the tool in forward mode over a run to pull the pipe into the ground, removing the ground piercing tool from the expander and pipe by moving it in a rearward direction through the newly installed pipe, and leaving the expander in the ground, preferably to form the front end of the newly installed pipe. It is not required that each of the foregoing steps be conducted in the order recited. For example, the expander could be secured to the pipe after which the expander and pipe could be fitted over the tool.

In another aspect, the invention provides a blind drain for a roadbed including an expander buried in the earth at the forwardmost end of the drain. The conical expander positioned at the front end of the drain is configured for use with an impact-type boring tool and adapted to be pulled behind the boring tool and enlarge the bore formed by the tool. A slotted or perforated pipe is secured to the expander, and a geotextile sock is positioned in the expander to prevent fines from entering the perforated pipe and plugging or restricting the pipe. A cap, screen or grate is used to close the rear end of the drain and prevent rodents and debris from entering the drain. Suitable means such as loose stones may be provided to fill the sock to prevent in from collapsing.

Other objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWING

The invention will hereafter be described with reference to the accompanying drawings, wherein like numerals denote like elements, and wherein:

FIG. 1 is a sectional view of an expander for use in connection with the invention;

FIG. 2 is a side view of an impact-type ground piercing tool with the expander of FIG. 1 and a pipe installed on the tool and shown in section;

FIG. 3 is a partial cross-section a railroad bed illustrating the installation of a blind drain in a method according to the invention; and FIG. 4 is a sectional view of a blind drain according to the invention.

DETAILED DESCRIPTION

Referring now to FIGS. 1 and 2, an apparatus 10 for installing an underground pipe according to the invention includes an elongated pneumatic piercing tool 12 having a tapered nose 14 and a conical sacrificial expander 16 fitted over tapered nose 14. Compressed air supplied to tool 12 via a hose 18 is used to reciprocate a striker which impacts an anvil to drive tool 12 through the ground. In one embodiment, tool 12 is reversible such that tool may be operated in the reverse mode for disengaging the tool from expander 16. The structure of one such tool is exemplified in commonly assigned Wentworth et al. U.S. Pat. No. 5,025,868, the contents of which are incorporated by reference herein. Reversible tools are also disclosed in commonly assigned U.S. Pat. No. 5,603,383 to Wentworth et al., and U.S. Pat. No. 5,505,270, to Wentworth, the disclosures of which are incorporated by reference herein.

Expander 16 includes a frustoconical front portion 20 welded or otherwise attached to a rearwardly-opening cylindrical die or collar 22. Expander 16 has a larger diameter than tool 12, enabling apparatus 10 to form a bore having a larger diameter than that of the tool. As illustrated, nose 20 of expander 16 is configured and sized to closely match the profile of intermediate tapered section 23 of nose 14. An opening 24 in the forwardmost end 26 of expander 16 allows the leading end of nose 14 to extend through the opening. Alternatively, front portion 20 may be configured with a closed front end, such that tapered nose 14 is completely enclosed in expander 16.

To secure expander 16 to a plastic pipe 28 such as a solid or perforated PVC or PE pipe so that the pipe can be towed through a bore behind the expander, self tapping threads 25 are formed on the inside surface of collar 22. To connect pipe 28 in the expander, the pipe is inserted into collar 22 and the pipe or expander rotated until threads 25 have engaged a sufficient length of the pipe to secure the pipe to the expander. One or more slots 30 formed in the sides of collar 22 allow cuttings generated as pipe 28 is threaded into the collar to fall out of the collar. Alternatively, pipe 28 can be secured to the expander with mechanical fasteners such as bolts or screws extending through collar 22 and the wall of pipe 28. Bolting pipe 28 to expander 16 in this manner may be preferable in the case of larger diameter pipes due to the high level of force required to thread the pipe into expander 16. It is also possible to pre-thread the outside of front end of the pipe 28, or fuse the leading end of the pipe 28 to the back of a pre-threaded plastic adapter which becomes part of pipe 28 in the finished pipeline or drain. It is also possible to hold the pipe inside the expander by means of a cable or rope attached to the back of the piercing tool at its front end, and to an end plate at its rear end. The end plate is tightened against the rear end opening of pipe 28 so that it holds pipe 28 in engagement with expander 16.

Referring now to FIG. 3, in a method according to the invention, one or more blind drains 42 are installed in a roadbed such as railroad bed 40 utilizing apparatus 10. Proper drainage of roadbeds, whether the beds support a railroad track or a vehicle road, is important to allow for soil compaction, drainage and to prevent erosion. U.S. Patent Publication No. 20050214070 to Harr, the contents of which are incorporated herein by reference, discloses a hydraulic wick apparatus and method for absorbing and draining accumulated water under a roadway. However, blind drains such as drain 42 are preferable where the roadbed can be accessed from only one side, or where the width of the roadbed is such that it is impractical or undesirable to form a bore completely through the bed. Further, in some locations the use of directional drilling machines to install at or near-grade drains may be impractical, whereas a pneumatic impact tool can be used to install perforated pipe at grade. Where practical, it may be desirable to install blind drains 42 from each side of bed 40, each drain extending approximately halfway through the roadbed, optionally on alternate sides in series. In this manner, drainage is provided evenly across the width of bed 40.

According to the invention, expander 16 is fitted onto the tapered head assemble of tool 12, and a perforated or slotted pipe 28 is secured to collar 22. Tool 12 is preferably selected to have a high energy to bore ratio, for example, a 5.875" pneumatic hammer is used with a 7.125" expander and 6.625" PE pipe. Tool 12 is positioned against roadbed 40 and operated in the forward mode, penetrating the roadbed while towing perforated pipe 28 into the bore behind the tool. Preferably, perforated pipe 28 is installed in roadbed 40 substantially horizontally or at a slight downward grade suitable for drainage. The grade angle may range from about 0 to 20 degrees.

When tool 12 has penetrated the bed to the desired position, operation of the tool is reversed to disengage it from expander 16. The tool is then removed from the bore by running it in reverse and/or pulling on the air hose 18 or a rope or cable attached to the rear of tool 12, leaving expander 16 and pipe 28 in place in roadbed 40. In the case of a non-reversible tool, the tool is removed by pulling air hose 18 and/or a rope or cable attached to the tool for that purpose. However, it is strongly preferred that the nose of the tool engage the inside of the expander by means of a locking taper, so that the tool body cannot move backward during the forward stroke of the striker. It may become difficult to remove the tool from the expander at the end of the bore unless the tool can be run in reverse mode to unlock it from the expander 16. Once the tool 12 has been disengaged from the expander 16 by running it in reverse mode, the tool can be pulled out manually using the air hose 18 or a rope/cable.

Referring to FIGS. 3 and 4, to prevent fines from entering and restricting pipe 28, a sock or tube 44 having a closed front end 46 is inserted into pipe 28 after the pipe has been installed in roadbed 40. Sock 44 may be formed from formed one or more layers of a strong, durable mold and mildew resistant mesh fabric such as a polyester geotextile. Sock 44 is filled with ballast 48 such as sand, river rock, crushed rock, small diameter stones, gravel, plastic or expanded plastic pellets or a similar material, and pushed into pipe 28 using a rod, pipe or other manual or powered means. It is most convenient to divide sock 44 into a series of sections 45 of convenient length (e.g., 5 feet), fill that section, tie off the open end, and then push it into pipe 28 using a pole or rod. Subsequent sections 45 are then inserted after the first section and the series of section disposed end-to-end comprise sock 44.

It may also be preferable to insert sock 44 into pipe 28 in an empty condition and then load the fill material into it thereafter. After sock 44 has been inserted into pipe 28, a cap 50 with a grate or screen is installed on the rear end opening of pipe 28 to prevent rodents and/or debris from entering drain 42.

Other variations are possible. Sock 44 may be fitted over a second, smaller diameter perforated pipe which is inserted into pipe 28 to form a double walled structure with sock 44 positioned between the walls. In another variation, sock 44 is fitted over a rigid steel mesh tube or wire coil, and the sock and tube are then inserted into pipe 28. In another variation, apparatus 10 is used to replace an existing pipe or drain. In this variation, the existing pipe or drain is burst as tool 12 advances. Expander 16 enlarges the bore while towing a replacement pipe or drain into the expanded bore. In the case of difficult soil conditions, it may also be desirable to drill or bore a pilot hole in roadbed 40 before apparatus 10 is used to install blind drain 42.

It will be understood that the foregoing description is of preferred exemplary embodiments of the invention, and that the invention is not limited to the specific forms shown. This and other modifications may be made in without departing from the scope of the invention as expressed in the appended claims.

The invention claimed is:

1. A method of installing a drain using an impact-type ground piercing tool comprising the steps of:
   fitting an expander onto a front nose of the tool;
   securing a perforated pipe to the expander so that the ground piercing tool is disposed inside of the pipe; operating the tool in forward mode over a run to pull the pipe into the ground;
   removing the ground piercing tool from the expander and pipe by moving it in a rearward direction through the newly installed pipe;
   leaving the expander buried in the ground permanently to form the front end of the newly installed pipe; and
   installing a filter in the pipe effective to prevent debris from entering the pipe through the perforations.

2. The method of claim 1 further comprising operating the tool in a reverse mode to disengage the tool from the expander and remove the tool from the pipe.

3. The method of claim 1, wherein the filter comprises an elongated geotextile sock disposed along the inner periphery of the pipe proximate the perforations, and means for preventing the sock from collapsing inside the pipeline.

4. The method of claim 1 further comprising operating the tool in a forward mode to pull the perforated pipe through the roadbed at a grade.

5. The method of claim 1 wherein the step of securing the pipe to the expander so that the ground piercing tool is disposed inside of the pipe comprises threading the pipe into threads formed on an inside surface of the expander.

* * * * *